United States Patent [19]

Bishara et al.

[11] Patent Number: 4,822,509

[45] Date of Patent: Apr. 18, 1989

[54] HIGHLY MAGNETIC IRON OXIDE POWDER

[75] Inventors: Jeries I. Bishara, Mentor; Anthony J. Vaccaro, Madison; Eric J. Rudd, Painesville, all of Ohio

[73] Assignee: ELTECH Systems Corporation, Boca Raton, Fla.

[21] Appl. No.: 928,230

[22] Filed: Nov. 6, 1986

[51] Int. Cl.$^4$ .............................................. C01G 49/06
[52] U.S. Cl. .................................................. 252/62.56
[58] Field of Search .................... 252/62.56; 360/134, 360/131; 428/329

[56] References Cited

U.S. PATENT DOCUMENTS

| | | | |
|---|---|---|---|
| 3,843,773 | 10/1974 | Pingaud | 252/62.56 |
| 3,928,709 | 12/1975 | Audran et al. | 252/62.56 |
| 4,002,804 | 1/1977 | Akashi et al. | 252/62.56 |
| 4,367,214 | 1/1983 | Sarnecki et al. | 252/62.56 |
| 4,376,714 | 3/1983 | Pingaud | 252/62.63 |
| 4,474,653 | 10/1984 | Beer et al. | 204/96 |

OTHER PUBLICATIONS

"Aging Effect of $(\gamma Fe_2O_3)_x(Fe_3O_4)_{1-x}$ Pigments in Magnetic Recording Tapes", Yasuo Imaoka et al., Ferrites: Proceedings of the International Conference, Jul. 1970, Japan.

"The Complete Handbook of Magnetic Recording" by Finn Jorgensen, pp. 192-193 (1986).

"IEEE Transactions on Matnetics", vol. MAG-22, No. 5, pp. 741-743 (1986).

"IEEE Transactions on Magnetics", vol. MAG-8, p. 648 (1972).

"IEEE Transactions on Magnetics", vol. MAG-18, No. 6, 1083 (1982)-'High Coercivity Particulate Magnetic Media In-Situ Partial Reduction of gamma $Fe_2O_3$ and Modified gamma $Fe_2O_3$' by V. M. De Palma et al.

*Primary Examiner*—Patrick P. Garvin
*Assistant Examiner*—George R. Fourson
*Attorney, Agent, or Firm*—John J. Freer

[57] ABSTRACT

A highly magnetic isotropic iron oxide powder with a uniform particle size distribution and particle size in the range from 0.005 to 0.2 micrometer consists of a mixed iron oxide exhibiting gamma ($Fe_2O_3$) and ferrite ($Fe_3O_4$) structure, having the empirical formula $Fe_{72-x}O_{96}$, where x has a value between 2 to 7, an aspect ratio of at most 2:1 and a temperature coefficient of coercivity of less than $-0.7\%$ per degree Celcius. The mixed oxide is optionally a cobalt-modified mixed iron oxide containing 2-6% by weight of cobalt and is obtained by heating ultrafine, ferrite particles in a controlled, oxidizing atmosphere at a temperature of 240° C. to 320° C. for a period of one to three hours.

5 Claims, 2 Drawing Sheets

HIGHLY MAGNETIC IRON OXIDE POWDER

FIELD OF THE INVENTION

This invention relates to a highly magnetic iron oxide powder with a uniform particle size distribution, its method of manufacture and magnetic media incorporating this powder.

BACKGROUND ART

Magnetic media today extensively use magnetic particles dispersed in a non-magnetic binder as the coating for discs and tapes. Gamma ferric oxide is typical of the magnetic particles used and derives its magnetic properties largely from shape anisotropy rather than magnetrocrystalline anisotropy. Thus the particles are acicular (needle-like or rod-like) with high aspect ratios as shown in the table of properties below:

| | |
|---|---|
| Coercivity | 300–500 oersteds |
| Saturation Magnetization | 70–75 emu/gramme |
| Remanence | 25–30 emu/gramme |
| Particle Size | 400–1000 nanometers |
| Surface Area (BET) | 15–30 m$^2$/gramme |
| Aspect Ratio | 6:1 to 10:1 |

The particles have a single preferred or "easy" axis of magnetization in the longitudinal direction and it is common practice to orient the dispersed particles during coating to maximize the recording properties of the tape or disc.

As shown by Pingand in U.S. Pat. Nos. 3,843,773 and 4,376,714 and by Audran et al in U.S. Pat. No. 3,928,709, acicular iron oxide particles are obtained by the conversion of acicular non-magnetic, alpha ferric oxide hydrate particles ($\alpha$-FeOOH) to acicular, magnetic, ferrous ferric oxide (Fe$_3$O$_4$) by dehydration and reduction in an atmosphere of hydrogen or natural gas at temperatures between 350° C. and 500° C. The magnetite produced is then oxidized to acicular, magnetic gamma ferric oxide ($\gamma$-Fe$_2$O$_3$) particles by heating in air at 250° to 300° C.

The coercivity range obtained with gamma-ferric oxide powders is limited whereas for several applications e.g., videotapes, digital recording, higher coercivity may be demanded. The introduction of cobaltous ions into the crystal lattice of the oxide significantly enhances the magnetic properties, providing coercivities ranging from 400 to 1000 oersteds, due to increased magneto-crystalline anisotropy. However uniformly-modified gamma iron oxide particles are sensitive to both thermal and mechanical stress as is discussed in "The Complete Handbook of Magnetic Recording" by Finn Jorgensen, pages 192–193, for example. On the other hand surface-modified or epitaxially-modified gamma iron oxide particles, wherein the cobalt ions may be present primarily in a thin layer at the surface of the particle, are significantly more stable than the uniformly-modified particles yet retain the enhanced magnetic properties. These properties and the superior thermal stability of the surface-modified, acicular, oxide particles are illustrated in data presented by A. Eiling et al in IEEE Transactions on Magnetics, Vol. MAG-22, No. 5, pps. 741–743 (1986).

As another approach to realize increased coercivity with oxide particles and therefore increased recording densities in magnetic media, mixtures of gamma iron oxide and magnetite particles have been considered. Thin films containing mixtures of gamma iron oxide and magnetite crystals were shown by N. Borelli et al, IEEE Transactions on Magnetics, Vol. MAG-8, 648(1972) to exhibit high coercivities. In an article entitled "High Coercivity Particulate Magnetic Media via In-Situ Partial Reduction of gamma Fe$_2$O$_3$ and Modified gamma-Fe$_2$O$_3$" by V. M. DePalma, M. F. Doerner and A. M. Ward, published in IEEE Transactions on Magnetics, Vol. MAG-18, No. 6, 1083 (1982) there is described a process for increasing the coercivity of particulate media involving an anaerobic cure followed by annealing in air at low temperatures, typically 60° C. to 95° C. for 100–1000 hours.

Interest in multi-axial or cubic or isotropic particles has been maintained within the recording industry. Such particles offer the capability of producing media with high coercivity and, in addition, could allow significantly higher ratios of pigment to binder to be used in the coatings. Furthermore, an isotropic particle offers the opportunity to record in both the longitudinal and perpendicular directions. It is therefore extremely desirable to develop stable, isotropic, highly magnetic, ultrafine particles.

A method of producing ultrafine particles of magnetite (Fe$_3$O$_4$) is described in U.K. Pat. No. 1,142,214 and the particles are claimed to be "substantially isotropic". The method involves control of both the pH and the temperature of a suspension of oxide-hydroxide particles while sparging with an oxidizing gas (air) to give ultrafine particles of magnetite. The particles produced by this method typically have an average diameter of 100 nanometers, with a distribution of particle sizes ranging from 50 to 1000 nanometers.

An electrochemical method for producing ultrafine, isotropic particles of magnetite or cobalt-modified magnetite is desribed by H. B. Beer et al in U.S. Pat. No. 4,474,653. Here careful control of the concentrations of ionic reactants and oxidant species at controlled pH leads to the formation of ultrafine particles. Particles of magnetite or cobalt-modified magnetite produced by this method are isotropic, with an average particle size of 20–40 nanometers and with a narrow particle size distribution of 15–150 nanometers as is shown in FIG. 1.

However the isotropic powders produced either as taught in GB Pat. No. 1,142,214 or U.S. Pat. No. 4,474,653 exhibit sensitivity to thermal and mechanical stress. For example the temperature coefficient of coercivity for a cobalt-modified isotropic ferrite powder is typically $-1.0\%$ per degree Celcius, i.e., for a powder of coercivity 800 oersteds, the loss of corrcivity with increased temperature is 8 oersteds per degree.

SUMMARY OF THE INVENTION

It has now been demonstrated that controlled oxidation of ultrafine, isotropic powders of magnetite or modified magnetite to produce a mixed oxide, Fe$_3$O$_4$/gamma Fe$_2$O$_3$, of specific composition defined from XRD analyses, gives a highly magnetic powder with unexpectedly superior thermal and mechanical stability.

According to a main aspect of the invention, there is provided a highly magnetic, isotropic, iron oxide powder with a uniform particle size distribution and particle size in the range from 15 to 200 nanometers characterized in that the iron oxide is a mixed iron oxide exhibiting gamma (Fe$_2$O$_3$) and ferrite (Fe$_3$O$_4$) structure, having the empirical formula Fe$_{72-x}$O$_{96}$, where x has a value from 2 to 7, an aspect ratio of at most 2:1, and a temperature coefficient of coercivity of less than −0.7% per degree Celsius.

The mixed oxide of the invention is advantageously a cobalt-modified mixed iron oxide containing 2–6% by weight of cobalt. Such mixed oxide powders are produced by controlled heating of isotropic ferrite particles, of uniform particle size and particle size distribution and aspect ratio substantially as given above, in a controlled atmosphere at a temperature between 160° C. and 400° C. but preferably between 240° C. and 320° C. for a period of 0.5 to 5.0 hours but preferably 1 to 3 hours.

The invention also pertains to a method of producing the highly magnetic iron oxide powder as defined above comprising producing ferrite particles substantially of the defined size/shape characteristics and subjecting the ferrite particles to controlled heating in air at a temperature between 160° C. and 400° C. but preferably between 240° C. to 320° C. for a period of 0.5 to 5.0 hours but preferably 1 to 3 hours to produce the mixed iron oxide of formula defined in claim 1.

The ferrite starting powders may be produced either by controlled precipitation from a solution containing ferrous ions and optionally cobaltous ions and simultaneous oxidation by air to maintain a certain pH in the solution or, according to the teachings of U.S. Pat. No. 4,474,653, by progressive dissolution of an iron anode and optionally a cobalt anode to promote controlled precipitation in the electrolyte again with oxidation by air to maintain a certain pH in that electrolyte. These methods will now be described more fully.

Using a Chemical Reactor

A standard chemical reactor with multi-access ports is used to prepare ultrafine particles of magnetite or cobalt modified magnetite. The reactor is filled with either water or with a dilute (1–5 wt %) solution of a suitable electrolyte, e.g., NaCl, KCl, or NaBr.

Solutions containing one to four molar ferrous ion (with a suitable counter ion, preferably chloride), cobaltous ion as 1–4% of the ferrous ion (again, generally using the chloride salt) and two to eight molar sodium or potassium hydroxide are added simultaneously at controlled rates. Typically, the rates of addition are from 5–50 milliliters per minute for a two liter reaction. The temperature of the reactor may range from 20°–90° C., but preferably 40°–70° C. The pH is carefully monitored and controlled by adjusting the rate of addition of hydroxyl ions and by adjusting the rate of air oxidation. A black precipitate is formed which may be filtered, washed, and dried.

It is possible to add one or more layers of cobalt-rich iron oxide to existing particles. The additional layer or layers are added by allowing solutions of ferrous and cobaltous salts to be pumped in a controlled manner into the reactor containing a slurry of the primary particles in the electrolyte. A solution of sodium hydroxide is added simultaneously and a positive atmosphere of nitrogen is maintained by sparging $N_2$ gas into the reactor. The primary particles may be non-doped iron oxide or cobalt-modified iron oxide. In each case an epitaxially-modified or surface-modified particle is obtained.

The particles, whether simple iron oxide, uniformly-modified or epitaxially-modified iron oxides, are oxidized under controlled conditions with respect to air pressure and temperature preferably pressures between 1.0 and 10.0 torr and temperatures between 240° C. and 320° C. for 0.5 to 5.0 hours but preferably 1 to 3 hours.

The physical and magnetic properties of a specimen epitaxially modified powder are listed below.

| | |
|---|---|
| Composition | Cobalt 2.5% |
| Cobalt Distribution | Uniform |
| Crystal Structure | $Fe_{72-x}O_{96}$, (x from 2 to 7) |
| Crystallite Size | 85 nm |
| Crystallite Shape | cubic, spherical |
| Aspect Ratio | 1.5:1 |
| Coercivity | 600 Oe |
| Saturation Magnetization | 69 emu/g |
| Squareness | 0.45 |
| Switching Field Distribution | 0.88 |
| Temp. Coefficient of Coercivity | 0.52%/°C. |
| Temp. Coefficient of Remanence | 0.40%/°C. |

Electrochemical Reactor

Three electrodes are immersed in a conductive aqueous electrolyte containing 1–10 wt. % of an ionizable salt such as sodium chloride, sodium bromide, or potassium chloride in a vessel in which a pH probe and a heater are included. The reactor is also provided with a means to introduce air at a controlled rate.

The first electrode is made of an electrolytic grade of iron and may be a plate, rod, perforated plate or mesh, or may be small chips contained in a basket fabricated from an inert material such as titanium. This electrode will be polarized anodically during the reaction to dissolve the iron. The cathode is also iron or steel and may again be a plate, rod or mesh, or iron chips contained in a basket. The cathode is also iron or steel and may again be a plate, rod or mesh, or iron chips contained in a basket. The cathode reaction is the decomposition of water to liberate hydrogen gas and generate hydroxyl ions. A second soluble anode is included, made of cobalt in the form of a plate, mesh, or rod, or from electrolytic grade cobalt chips in an inert basket. When non-modified magnetite is to be produced, this second anode is omitted.

The temperature of the reactor may be between 25°–90° C., but preferably is maintained between 60°–80° C. The electrodes are polarized at current densities ranging from 0.5–1.0 kA/m² and air is continuously bubbled through the solution at a rate sufficient to quantitatively oxidize the metal ions generated by the passage of current and thereby form magnetite or cobalt-modified magnetite as an insoluble precipitate. The air flowrates used range from 10–80 liters per minute, preferably 40–60 liters per minutes.

The pH of the solution during the reaction is continuously monitored and adjusted by addition of small amounts of acid or base to be maintained between 6.5 and 9.0. Changes of air flowrate within the ranges stated can also control the pH of the solution.

The slurry of black precipitate is filtered, washed free of excess electrolyte, and dried prior to oxidation by heating in a controlled oxygen atmosphere at temperatures ranging from 240°–320° C. for 1 to 3 hours. In this oxidative step, the magnetite or cobalt modified magnetite is converted to a mixed oxide structure $Fe_{72-x}O_{96}$, where x has a value from 2 to 7.

The physical and magnetic properties of a specimen powder are listed below.

| | |
|---|---|
| Composition | Cobalt, 4.5 wt % |
| Cobalt Distribution | Uniform |
| Crystal Structure | Mixed Oxide |

-continued

|  | Fe$_{72-x}$O$_{96}$, (x from 2 to 7) |
| --- | --- |
| Crystallite Size | 80 nm |
| Crystallite Shape | cubic, spherical |
| Aspect Ratio | <1.5:1 |
| Coercivity | 960 Oe |
| Saturation Magnetization | 72 emu/g |
| Squareness | 0.47 |
| Switching Field Distribution | 0.72 |
| Temp. Coefficient of Coercivity | 0.49%/°C. |
| Temp. Coefficient of Remanence | 0.39%/°C. |

A further aspect of the invention consists of magnetic media, typically discs and tapes, in which the ultrafine, isotropic particles of iron oxide or modified iron oxide as set out above are dispersed by conventional methods in a suitable binder. Typical binders are polymeric binding agents well known for the manufacture of magnetic recording media, such as copolymers of vinyl acetate with vinyl chloride, copolymers of acrylic and methacrylic esters, copolymers of styrene and butadiene, homopolymers or copolymers, such as polyamides, polyurethanes and polyesters as well as mixtures of these binders.

Very good results can be obtained using a polyurethane binder and in contrast to the dispersion of typical acicular iron oxide particles, a significantly higher pigment to binder ratio can be used in the dispersion of the ultrafine particles of the invention. For example, a useful dispersion was prepared with a polyurethane binder containing at least a 3:1 and preferably 4:1 ratio of pigment to binder. It will be recognized that this higher ratio of pigment to binder provides a significantly higher recording density to the fabricated disc or tape than that obtained with state-of-the-art oxide particles.

Suitable solvents employed in the preparation of the magnetic dispersions include organic materials such as methylethylketone, ethyl acetate, butyl acetate, cyclohexanone, tetrahydrofuran, butyl alcohol, methylene chloride as well as mixtures thereof. The magnetic dispersion can contain other additives such as lubricants and wetting agents as would be obvious to those skilled in the art.

Figure 1:
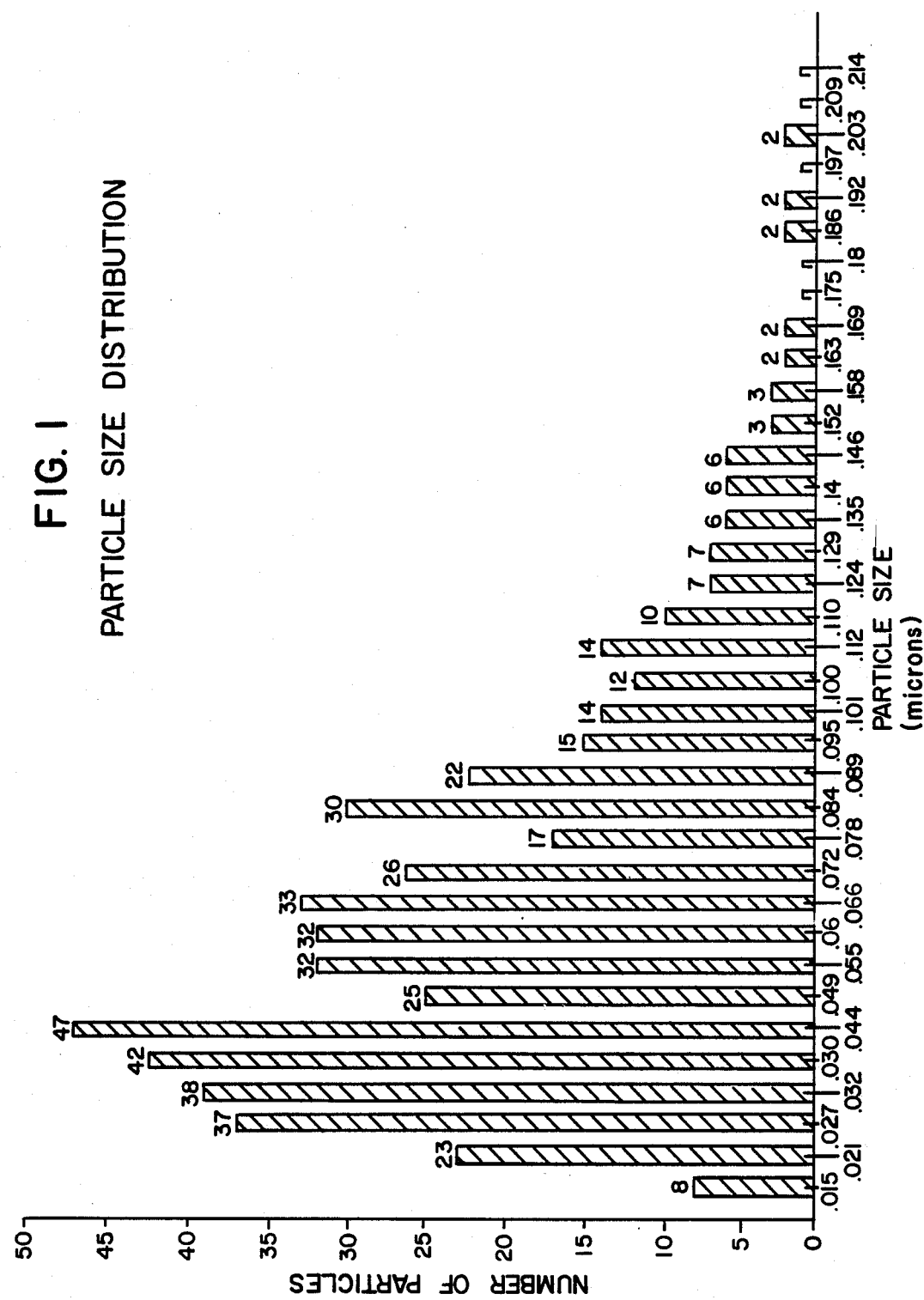
FIG. 1 shows the particle size distribution of isotropic iron oxide powder according to the invention.

The invention will further be illustrated in the following Examples which gives comparisons of the properties of the mixed-oxide powders of the invention with state-of-the-art powders.

EXAMPLE 1

Samples of ultrafine, isotropic, cobalt modified magnetite were prepared according to the method described above using the chemical reactor, with the following parameters:

| Reactor volume | 12 liter RB flask |
| --- | --- |
| pH of solution | 7.25 |
| Temperature | 70° C. |
| Flowrate of air | 40 liters/minutes |
| Ion flux rate | 3.0 moles M$^{2+}$/hour |
| Ratio of Reactants, final | 1.25 moles M$^{2+}$/liter air |

The physical properties of the cobalt-modified magnetite powder are shown as follows:

| % cobalt | 4.0 |
| --- | --- |
| Particle size, average, nanometers | 60 |
| Particle size distribution, nanometers | 15-150 |
| Surface area, BET, m$^2$/gamme | 14-16 |

Part of this powder was converted fully to the cobalt-modified gamma iron oxide by heating in air at 200°-220° C. for one hour. A second part of the powder was oxidized under controlled conditions to form the mixture of magnetite and gamma oxide according to the invention.

The magnetic properties of the two powder samples are compared as Table I.

TABLE I

|  | gamma oxide | mixed oxide |
| --- | --- | --- |
| Coercivity, oersteds | 580 | 770 |
| Saturation magnetization, emu/gramme | 66 | 75 |
| Squareness | 0.54 | 0.44 |
| Switching field distribution | 0.765 | 0.8 |
| Temperature coefficient of coercivity, % per °C. | −1.1 | −0.56 |

It is observed that the powder of the invention has a significantly increased coercivity and saturation magnetization, but more importantly for applications in magnetic media, shows superior thermal stability, −0.56% per degree Celsius compared to −1.1% per degree Celsius. This improvement can also be expressed in oersteds per degree Celsius, the powder of the invention showing a decrease of only 4.3 oersteds per degree whereas the standard cobalt-modified gamma oxide shows a decrease of 6.4 oersteds per degree.

EXAMPLE 2

Using similar procedures a cobalt-modified magnetite powder containing 3 weight % cobalt was prepared. Again part of the magnetite powder was fully oxidized to the modified gamma oxide by heating at 200°–220° C. in air for one hour. A second part of the magnetite powder was oxidized under controlled conditions to form a mixed oxide according to the invention. The magnetic properties of the two powders are compared as Table II.

TABLE II

|  | gamma oxide | mixed oxide |
|---|---|---|
| Coercivity, oersteds | 440 | 575 |
| Saturation magnetization, emu/gramme | 67 | 74 |
| Squareness | 0.43 | 0.35 |
| Switching field distribution | 0.98 | 0.9 |
| Temperature coefficient of coercivity % per °C. | −1.0 | −0.5 |

A similar improvement in properties is observed as for Example 1.

Analytical Data

XRD analysis of ferrite powders can clearly distinguish the presence of magnetite ($Fe_3O_4$) and the gamma and alpha oxides (gamma-$Fe_2O_3$ and alpha-$Fe_2O_3$), the alpha oxide being non-magnetic. The crystal structures of magnetite and gamma-oxide are comparable being cubic and tetragonal respectively and the so-called 220 phase within the crystal gives a specific angle of reflection that is different in magnetite and in gamma-oxide. More importantly, that angle of reflection varies with the relative content of gamma-$Fe_2O_3$ in the mixed oxide.

It can be shown that the coercivity and thermal stability (as reflected by the temperature coefficient of coercivity) are also markedly dependent upon the ratio of the two oxides as indicated by the angle of reflection from the 220 phase. For a cobalt-modified powder containing 4 weight % cobalt, typical values are shown:

|  | State-of-the-Art | | The Invention |
|---|---|---|---|
| Crystal lattice | $Fe_3O_4$ | $Fe_2O_3$ | Mixed Oxide |
| Angle of Reflection | 30.10 | 30.30 | 30.14–30.20 |
| Coercivity (Oersteds) | 450 | 550 | 850–950 |
| Temperature Coeff. % per °C. | −1.0 | −1.0 | −0.5 |

Figure 2:
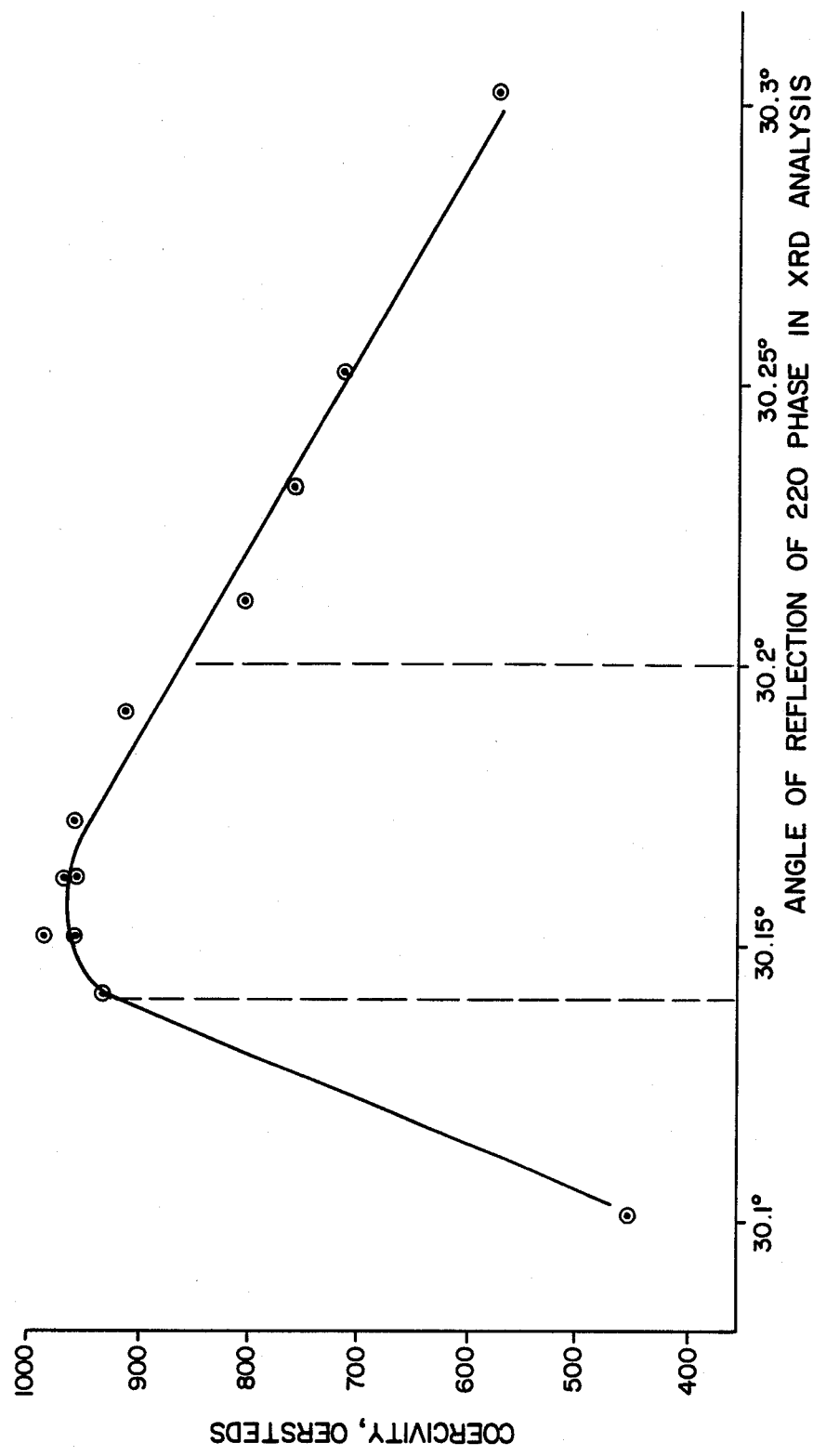
FIG. 2 is a graph showing the coercivity as a function of the angle of reflection of the 220 phase for a series of iron oxide powders according to the invention.

The dependence of the coercivity of the magnetic powder upon the degree of oxidation, as reflected by the ratio of magnetite to gamma oxide in the powder, is shown in FIG. 2. The data was obtained using a highly magnetic, isotropic, ultrafine powder prepared as set out above, the powder containing 4% cobalt by weight. It can be seen that maximum enhancement of coercivity corresponds to an angle of reflection in the XRD analysis between 30.14 and 30.20. This corresponds to the value of x from 2 to 7 in the formula given above.

Fabrication of Magnetic Media

A sample of the ultrafine, isotropic, modified gamma oxide powder, prepared by the techniques described above, was dispersed in a polyurethane binder using approximately 4% by weight of a standard surfactant. The pigment to binder ratio in the dispersion was 4:1.

The dispersion was milled by several passes through a horizontal Premier Mill and then used to coat 3 mil polyester film with a Passavant Gravure Coater. Several hundred 5¼" floppy discs were punched from the coated film, and the discs burnished and then jacketed.

400 discs were certified on a commercial certifier at the 50% threshold and the results compared to standard 1.6 Megabyte media treated in the same manner.

| Total Yield from standard media | 92.4% |
|---|---|
| Total Yield from the isotropic pigment | 92.2% |

The recording performance of the 5¼" discs was evaluated using a Shugart 410 drive with a standard head, and the uniformity of the discs was found to be excellent and the output signal was good.

We claim:

1. A highly magnetic isotropic iron oxide powder of cubic-shaped, multi-axial particles, said powder having an at least substantially uniform particle size distribution and particle size in the range from 0.005 to 0.2 micrometer characterized in that the iron oxide is a mixed iron oxide exhibiting gamma ($Fe_2O_3$) and ferrite ($Fe_3O_4$) structure, having the empirical formula $Fe_{72-x}O_{96}$, where x has a value between 2 to 7, an aspect ratio of not substantially above about 1.5:1 and a temperature coefficient of coercivity of less than −0.7% per degree Celcius.

2. The powder of claim 1, wherein the mixed iron oxide is a cobalt-modified mixed iron oxide containing 2–6% by weight of cobalt.

3. The powder of claim 1 or 2, obtained by heating ultrafine, ferrite particles in an oxidizing atmosphere at a temperature of 240° C. to 320° C. for a period of one to three hours.

4. A magnetic media in which the mixed iron oxide particles of claim 1 or 2 are dispersed in a non-magnetic binder.

5. The magnetic media of claim 4, wherein the weight ratio of the mixed iron oxide particles to the non-magnetic binder is at least 3:1.

* * * * *